(12) United States Patent
Ogawa et al.

(10) Patent No.: US 12,157,924 B2
(45) Date of Patent: Dec. 3, 2024

(54) HOT-PRESSED MEMBER, STEEL SHEET FOR HOT PRESSING, AND METHODS FOR PRODUCING THE HOT-PRESSED MEMBER AND THE STEEL SHEET FOR HOT PRESSING

(71) Applicant: JFE STEEL CORPORATION, Tokyo (JP)

(72) Inventors: Shuhei Ogawa, Tokyo (JP); Minoru Tanaka, Tokyo (JP); Rinta Sato, Tokyo (JP); Daisuke Mizuno, Tokyo (JP); Seiji Nakajima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/032,298

(22) PCT Filed: Aug. 18, 2021

(86) PCT No.: PCT/JP2021/030091
§ 371 (c)(1),
(2) Date: Apr. 17, 2023

(87) PCT Pub. No.: WO2022/091529
PCT Pub. Date: May 5, 2022

(65) Prior Publication Data
US 2023/0392226 A1    Dec. 7, 2023

(30) Foreign Application Priority Data

Oct. 27, 2020  (JP) ................................ 2020-179397

(51) Int. Cl.
*C21D 9/46*    (2006.01)
*C21D 7/02*    (2006.01)
(Continued)

(52) U.S. Cl.
CPC ................. *C21D 9/46* (2013.01); *C21D 7/02* (2013.01); *C21D 8/0205* (2013.01);
(Continued)

(58) Field of Classification Search
None
See application file for complete search history.

(56) References Cited

U.S. PATENT DOCUMENTS

| | | |
|---|---|---|
| 2017/0145533 A1 | 5/2017 | Sengoku et al. |
| 2020/0032360 A1 | 1/2020 | Sengoku et al. |

(Continued)

FOREIGN PATENT DOCUMENTS

| | | |
|---|---|---|
| EP | 3 409 807 A1 | 12/2018 |
| EP | 3 828 299 A1 | 6/2021 |

(Continued)

OTHER PUBLICATIONS

Nov. 2, 2021 International Search Report issued in International Patent Application No. PCT/JP2021/030091.

(Continued)

*Primary Examiner* — Daniel J. Schleis
(74) *Attorney, Agent, or Firm* — Oliff PLC

(57) ABSTRACT

A hot-pressed member, a steel sheet for hot pressing, and methods for producing the hot-pressed member and the steel sheet for hot pressing. The hot-pressed member includes a steel sheet and a Zn-based alloy coated layer disposed on at least one surface of the steel sheet. The Zn-based alloy coated layer includes a solid solution phase including Zn with the balance being Fe and incidental impurities, an intermetallic compound phase including Fe with the balance being Zn and incidental impurities, and an oxide layer including Zn. The oxide layer serves as an uppermost layer of the Zn-based alloy coated layer and splits the intermetallic compound phase. The split density in at least one (Continued)

cross-section of the oxide layer per unit cross-section is 10 split positions/mm or more.

9 Claims, 1 Drawing Sheet

(51) Int. Cl.
| | |
|---|---|
| C21D 8/02 | (2006.01) |
| C22C 18/04 | (2006.01) |
| C22C 38/00 | (2006.01) |
| C22C 38/02 | (2006.01) |
| C22C 38/04 | (2006.01) |
| C22C 38/06 | (2006.01) |
| C22C 38/26 | (2006.01) |
| C22C 38/28 | (2006.01) |
| C22C 38/32 | (2006.01) |
| C22C 38/60 | (2006.01) |
| C23C 2/26 | (2006.01) |
| C23C 2/06 | (2006.01) |
| C25D 3/22 | (2006.01) |
| C25D 5/48 | (2006.01) |

(52) U.S. Cl.
CPC ......... *C21D 8/0221* (2013.01); *C21D 8/0247* (2013.01); *C21D 8/0278* (2013.01); *C22C 18/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/26* (2013.01); *C22C 38/28* (2013.01); *C22C 38/32* (2013.01); *C22C 38/60* (2013.01); *C23C 2/26* (2013.01); *C23C 2/06* (2013.01); *C25D 3/22* (2013.01); *C25D 5/48* (2013.01)

(56) References Cited

U.S. PATENT DOCUMENTS

| | | |
|---|---|---|
| 2020/0173004 A1 | 6/2020 | Fujiwara et al. |
| 2021/0010100 A1 | 1/2021 | Maeda et al. |

FOREIGN PATENT DOCUMENTS

| | | | |
|---|---|---|---|
| JP | H06-33213 A | | 2/1994 |
| JP | H10-317121 A | | 12/1998 |
| JP | 2003-073774 A | | 3/2003 |
| JP | 2015-81368 A | | 4/2015 |
| JP | 2015081368 A | * | 4/2015 |
| JP | 2018-204065 A | | 12/2018 |
| WO | 2015/152263 A1 | | 10/2015 |
| WO | 2018/179395 A1 | | 10/2018 |
| WO | 2019/189067 A1 | | 10/2019 |
| WO | 2020/079926 A1 | | 4/2020 |
| WO | 2021/019829 A1 | | 2/2021 |

OTHER PUBLICATIONS

Sep. 28, 2023 Search Report issued in European Patent Application No. 21885650.8.

* cited by examiner

HOT-PRESSED MEMBER, STEEL SHEET FOR HOT PRESSING, AND METHODS FOR PRODUCING THE HOT-PRESSED MEMBER AND THE STEEL SHEET FOR HOT PRESSING

TECHNICAL FIELD

This application relates to a hot-pressed member, a steel sheet for hot pressing, and methods for producing the hot-pressed member and the steel sheet for hot pressing. The application relates specifically to a hot-pressed member and a steel sheet for hot pressing which are excellent in terms of post-coating corrosion resistance and a hydrogen release property and methods for producing the hot-pressed member and the steel sheet for hot pressing.

BACKGROUND

In the automotive field, increases in the performance of materials, that is, steel sheets, and reductions in the weights of the steel sheets have been accelerated and the use of anticorrosive high-strength hot-dip galvanized steel sheets or electrogalvanized steel sheets has been increased. However, with an increase in the strength of a steel sheet, in many cases, the press formability of the steel sheet becomes degraded and it becomes difficult to produce parts having complex shapes. Examples of automotive parts that are required to have a certain anticorrosive property and difficult to form include undercarriage members, such as a chassis, and frame structure members, such as a B-pillar.

Under the above circumstance, there has been a rapid increase in the production of automotive parts by hot pressing, which enables both press formability and high strength to be readily achieved compared with cold pressing. There have been developed various techniques for addressing the issues on the hot pressing technique.

In particular, since the use of a Zn-based alloy coated steel sheet as a steel sheet for hot pressing enhances the corrosion resistance of the hot-pressed member produced as a final product, there has been proposed a technique that relates to a steel sheet for hot pressing which includes a zinc-based alloy coated layer (Zn-based alloy coated layer). For example, Patent Literature 1 discloses a steel sheet for hot pressing which includes a steel sheet and a coated layer that is composed of zinc or a zinc-based alloy and disposed on the surface of the steel sheet, the coated layer including a barrier layer that serves as a surface layer and reduces the evaporation of zinc during heating.

CITATION LIST

Patent Literature

PTL 1: Japanese Unexamined Patent Application Publication No. 2003-73774

SUMMARY

Technical Problem

Recently, a zirconium-based chemical conversion treatment has been being widely used instead of the zinc phosphate-based chemical conversion treatment known in the related art. It has been also required that members that have been subjected to the zirconium-based chemical conversion treatment and electrodeposition coating have certain post-coating corrosion resistance.

The hot-pressed member disclosed in Patent Literature 1, which is a hot-pressed member produced by heating a Zn-based alloy coated steel sheet, has excellent corrosion resistance without further coating and has excellent post-coating corrosion resistance when being subjected to a zinc phosphate-based chemical conversion treatment. However, in the case where the hot-pressed member described in Patent Literature 1 is subjected to a zirconium-based chemical conversion treatment, post-coating corrosion resistance may become insufficient.

In order to prevent the delayed fracture of a hot-pressed member, it is desired that the hydrogen that enters a steel sheet for hot pressing during the production of the steel sheet be released in the production of the hot-pressed member with efficiency. That is, the development of a hot-pressed member having an excellent hydrogen release property, a method for producing the hot-pressed member, a steel sheet for hot pressing which is used for producing a hot-pressed member having an excellent hydrogen release property, and a method for producing the steel sheet for hot pressing has been anticipated.

The disclosed embodiments were made in light of the above issues. An object of the disclosed embodiments is to provide a hot-pressed member having excellent post-coating corrosion resistance, that is, in particular, excellent post-coating corrosion resistance after the hot-pressed member has been subjected to a zirconium-based chemical conversion treatment, and an excellent hydrogen release property and a method for producing the hot-pressed member. Another object of the disclosed embodiments is to provide a steel sheet for hot pressing which is suitable for hot-pressed members having excellent post-coating corrosion resistance and an excellent hydrogen release property and a method for producing the steel sheet for hot pressing.

Solution to Problem

The inventors conducted extensive studies in order to address the above issues and obtained the following knowledge.

(1) For enhancing the post-coating corrosion resistance and hydrogen release property of the hot-pressed member, it is effective to form an oxide layer in a Zn-based alloy coated layer disposed on the surface of the hot-pressed member such that the oxide layer serves as an uppermost layer of the Zn-based alloy coated layer and splits an intermetallic compound phase and such that the split density in the oxide layer per unit cross-section with respect to the intermetallic compound phase is equal to or higher than a predetermined value.

(2) A hot-pressed member having excellent post-coating corrosion resistance and an excellent hydrogen release property can be produced by hot-pressing a steel sheet for hot pressing which includes a Zn-based alloy coated layer in which the crack density per unit cross-section is equal to or higher than a predetermined value.

(3) For forming cracks in the Zn-based alloy coated layer of the steel sheet for hot pressing, which is used for producing the hot-pressed member, such that the crack density per unit cross-section is equal to or higher than a predetermined value, it is effective to immerse a steel sheet provided with a Zn-based alloy coated layer in an acidic aqueous solution or to apply a strain to the Zn-based alloy coated layer of the steel sheet.

The disclosed embodiments are based on the above knowledge. The summary of the disclosed embodiments is as follows.

[1] A hot-pressed member including a steel sheet and a Zn-based alloy coated layer disposed on at least one surface of the steel sheet, the Zn-based alloy coated layer including:

a solid solution phase including Zn with the balance being Fe and incidental impurities, or a solid solution phase including Zn and at least one element selected from Al, Mg, Si, Sr, Mn, Ti, Sn, In, Bi, Pb, and B with the balance being Fe and incidental impurities, an intermetallic compound phase including Fe with the balance being Zn and incidental impurities, or an intermetallic compound phase including Fe and at least one element selected from Al, Mg, Si, Sr, Mn, Ti, Sn, In, Bi, Pb, and B with the balance being Zn and incidental impurities, and an oxide layer including Zn, wherein the oxide layer serves as an uppermost layer of the Zn-based alloy coated layer and splits the intermetallic compound phase, and a split density in at least one cross-section of the oxide layer per unit cross-section is 10 split positions/mm or more.

[2] The hot-pressed member described in [1], wherein split densities in two orthogonal cross-sections of the oxide layer per unit cross-section are both 10 split positions/mm or more.

[3] A steel sheet for hot pressing, the steel sheet including a steel sheet and a Zn-based alloy coated layer disposed on at least one surface of the steel sheet, the Zn-based alloy coated layer including at least one element selected from Fe, Al, Mg, Si, Sr, Mn, Ti, Sn, In, Bi, Pb, and B with the balance being Zn and incidental impurities, a total content of the at least one element being 0.1% to 60% by mass, the Zn-based alloy coated layer having a coating weight of 10 to 90 g/m², wherein the Zn-based alloy coated layer has a crack formed therein, the crack splitting the Zn-based alloy coated layer, and a crack density in at least one cross-section of the Zn-based alloy coated layer per unit cross-section is 10 split positions/mm or more.

[4] The steel sheet for hot pressing described in [3], wherein crack densities in two orthogonal cross-sections of the Zn-based alloy coated layer per unit cross-section are both 10 split positions/mm or more.

[5] A method for producing a steel sheet for hot pressing, the method including:

immersing a steel sheet provided with a Zn-based alloy coated layer disposed on at least one surface of the steel sheet, the Zn-based alloy coated layer including at least one element selected from Fe, Al, Mg, Si, Sr, Mn, Ti, Sn, In, Bi, Pb, and B with the balance being Zn and incidental impurities, a total content of the at least one element being 0.1% to 60% by mass, the Zn-based alloy coated layer having a coating weight of 10 to 90 g/m², in an acidic aqueous solution having a pH of 4.0 or less for 1.5 seconds or more, or applying a strain to the Zn-based alloy coated layer.

[6] The method for producing a steel sheet for hot pressing described in [5], wherein the acidic aqueous solution is a plating solution used for forming the Zn-based alloy coated layer.

[7] A method for producing a hot-pressed member, the method including heating a steel sheet for hot pressing produced by the production method described in [5] or [6] to a temperature range of an $Ac_3$ transformation temperature to 1000° C. and subsequently performing hot pressing.

[8] A method for producing a hot-pressed member, the method including heating a steel sheet to a temperature range of an $Ac_3$ transformation temperature to 1000° C. and subsequently performing hot pressing, the steel sheet being provided with a Zn-based alloy coated layer disposed on at least one surface of the steel sheet, the Zn-based alloy coated layer including at least one element selected from Fe, Al, Mg, Si, Sr, Mn, Ti, Sn, In, Bi, Pb, and B with the balance being Zn and incidental impurities, a total content of the at least one element being 0.1% to 60% by mass, the Zn-based alloy coated layer having a coating weight of 10 to 90 g/m², wherein the Zn-based alloy coated layer has a crack formed therein, the crack splitting the Zn-based alloy coated layer, and a crack density in at least one cross-section of the Zn-based alloy coated layer per unit cross-section is 10 split positions/mm or more.

Advantageous Effects

According to the disclosed embodiments, a hot-pressed member that has excellent post-coating corrosion resistance, that is, in particular, excellent post-coating corrosion resistance after the hot-pressed member has been subjected to a zirconium-based chemical conversion treatment, and an excellent hydrogen release property can be produced. According to the disclosed embodiments, furthermore, a steel sheet for hot pressing which is suitable for hot-pressed members having excellent post-coating corrosion resistance and an excellent hydrogen release property can be produced.

DETAILED DESCRIPTION

Figure 1:
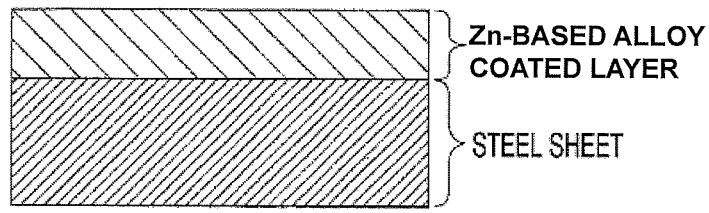
FIG. 1 is a schematic diagram illustrating a cross-section of a Zn-based alloy coated layer in which cracks are not formed, before hot pressing (before heating).

An embodiment of the disclosed embodiments is described below. It should be noted that the following description describes a preferable embodiment of the disclosed embodiments but does not limit the disclosed embodiments.

The contents of elements included in the chemical composition of steel are all expressed in "% by mass", which is referred to simply as "%" hereinafter unless otherwise specified.

1) Hot-Pressed Member

A hot-pressed member according to the disclosed embodiments includes a steel sheet and a Zn-based alloy coated layer disposed on at least one surface of the steel sheet, the Zn-based alloy coated layer including a solid solution phase and an intermetallic compound phase. The solid solution phase includes Zn with the balance being Fe and incidental impurities or includes Zn and at least one element selected from Al, Mg, Si, Sr, Mn, Ti, Sn, In, Bi, Pb, and B with the balance being Fe and incidental impurities. The intermetallic compound phase includes Fe with the balance being Zn and incidental impurities or includes Fe and at least one element selected from Al, Mg, Si, Sr, Mn, Ti, Sn, In, Bi, Pb, and B with the balance being Zn and incidental impurities. The Zn-based alloy coated layer includes an oxide layer including Zn. The oxide layer serves as an uppermost layer of the Zn-based alloy coated layer. The oxide layer also splits the intermetallic compound phase. The split density in at least one cross-section of the oxide layer per unit cross-section is 10 split positions/mm or more.

When a steel sheet provided with a Zn-based alloy coated layer is hot-pressed, Zn included in the Zn-based alloy coated layer diffuses into the base steel sheet and, as a result, a solid solution phase that includes Zn with the balance being Fe and incidental impurities is formed in the diffusion region. Simultaneously, Zn included in the Zn-based alloy coated layer and oxygen present in the heating atmosphere combine with each other to form an oxide layer including Zn. A portion of the Zn-based alloy coated layer which is an intermetallic compound that does not contribute to the diffusion to the base steel sheet or the formation of the oxide layer remains as an intermetallic compound phase. Since the intermetallic compound phase includes Fe diffused from the base steel sheet, an intermetallic compound phase including Fe with the balance being Zn and incidental impurities is formed.

In the case where the Zn-based alloy coated layer includes Zn and at least one element selected from Al, Mg, Si, Sr, Mn, Ti, Sn, In, Bi, Pb, and B, when a steel sheet provided with the Zn-based alloy coated layer is hot-pressed, the following phenomenon occurs: Zn and the elements other than Zn which are included in the Zn-based alloy coated layer diffuse into the base steel sheet and, as a result, a solid solution phase that includes Zn and at least one element selected from Al, Mg, Si, Sr, Mn, Ti, Sn, In, Bi, Pb, and B with the balance being Fe and incidental impurities is formed in the diffusion region. Simultaneously, Zn included in the Zn-based alloy coated layer and oxygen present in the heating atmosphere combine with each other to form an oxide layer including Zn. A portion of the Zn-based alloy coated layer which is an intermetallic compound that does not contribute to the diffusion to the base steel sheet or the formation of the oxide layer remains as an intermetallic compound phase. Since the intermetallic compound phase includes Fe diffused from the base steel sheet, an intermetallic compound phase including Fe and at least one element selected from Al, Mg, Si, Sr, Mn, Ti, Sn, In, Bi, Pb, and B with the balance being Zn and incidental impurities is formed.

Since both solid solution phase and intermetallic compound phase include Zn, which has a sacrificial protection effect, they enhance corrosion resistance. The oxide layer including Zn enables a uniform and dense coating to be formed by a zinc phosphate-based chemical conversion treatment or zirconium-based chemical conversion treatment, which is performed as a coating pretreatment, and therefore enhances coating adhesion. Thus, all of the solid solution phase, intermetallic compound phase, and oxide layer are essential structural requirements for achieving the post-coating corrosion resistance intended in the disclosed embodiments.

In the disclosed embodiments, the oxide layer serves as an uppermost layer of the Zn-based alloy coated layer and is also arranged in a direction perpendicular to the surface of the Zn-based alloy coated layer. Thus, the oxide layer splits the intermetallic compound phase. The oxide layer splits only the intermetallic compound phase but not the solid solution phase. The oxide layer splits the intermetallic compound phase in at least one cross-section thereof; the above cross-section is not limited to a cross-section taken in a specific direction, such as a cross-section taken in the rolling direction or a cross-section taken in a direction perpendicular to the rolling direction. The expression "splits the intermetallic compound phase" above means that the edges of the oxide layer that splits the intermetallic compound reach the respective edges of the intermetallic compound phase in the thickness direction.

The oxide layer according to the disclosed embodiments serving as an uppermost layer of the Zn-based alloy coated layer and splitting the intermetallic compound phase is an essential constituent element for achieving the intended post-coating corrosion resistance and the intended hydrogen release property.

First, the reasons for which the presence of the oxide layer according to the disclosed embodiments enhances the post-coating corrosion resistance are described below.

Figure 2:
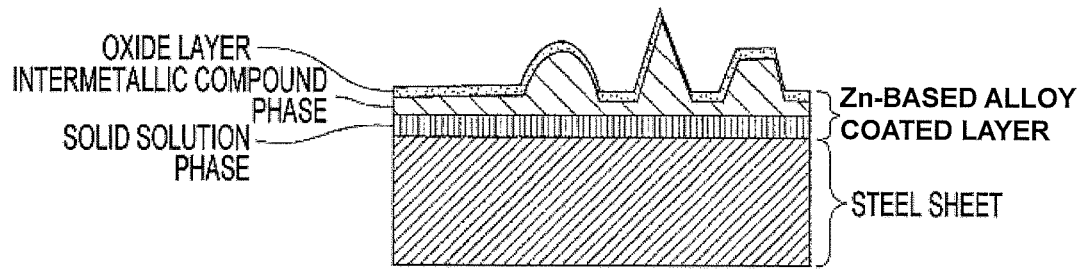
FIG. 2 is a schematic diagram illustrating a cross-section of a Zn-based alloy coated layer in which cracks are not formed, after hot pressing (after heating).

When a steel sheet provided with a common Zn-based alloy coated layer that does not have cracks formed therein (FIG. 1) is hot-pressed, large irregularities having a height of, for example, more than 10 μm are formed in the surface of the Zn-based alloy coated layer (FIG. 2). The inventors consider the reasons as follows.

When the temperature of the steel sheet is increased by the heating performed prior to the hot pressing, an oxide layer is formed in the surface of the Zn-based alloy coated layer with an increase in temperature. Upon the temperature of the steel sheet exceeding the melting point of the Zn-based alloy coated layer, the coated layer interposed between the oxide layer and the steel sheet becomes melted and liquefied. While the heating is continued and the temperature of the steel sheet keeps increasing, the oxide layer also keeps growing. In this step, in a direction perpendicular to the surface of the coated layer, the oxide layer grows while the thickness of the oxide layer is increased. In a direction parallel to the surface of the coated layer, the oxide layer grows while irregularities are formed therein and the surface area is increased. This is because the coated layer interposed between the oxide layer and the steel sheet is flowable, that is, liquid, and the shape of the oxide layer can be changed.

When the hot-pressed member that includes an oxide layer having large irregularities, which is produced in the above-described manner, is subjected to a zirconium-based chemical conversion treatment and electrodeposition coating and the post-coating corrosion resistance thereof is determined, red rust is significantly formed in common portions in which cross-cut is not formed. This is presumably because electrodeposition coating cannot follow the irregularities of the surface of the hot-pressed member, the thickness of the electrodeposition coating becomes excessively small at the protrusions, and red rust is formed at such portions.

Figure 3:
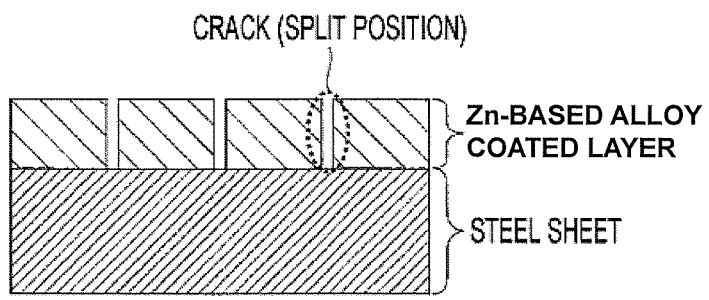
FIG. 3 is a schematic diagram illustrating a cross-section of a Zn-based alloy coated layer in which cracks are formed, before hot pressing (before heating).
Figure 4:
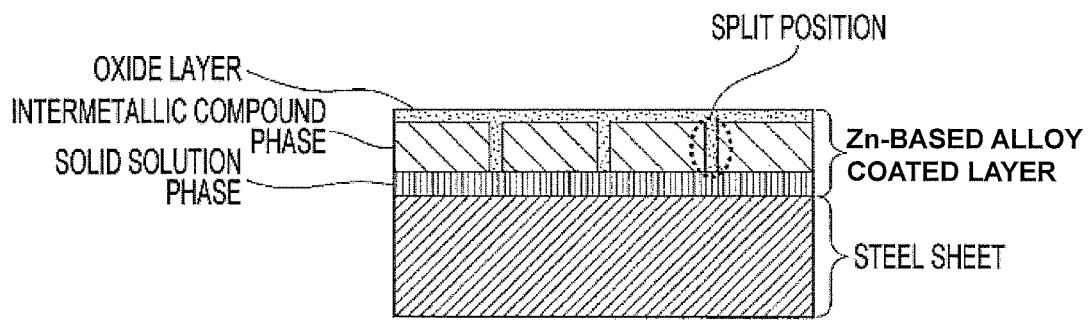
FIG. 4 is a schematic diagram illustrating a cross-section of a Zn-based alloy coated layer in which cracks are formed, after hot pressing (after heating).

In contrast, in the case where a steel sheet provided with a Zn-based alloy coated layer in which cracks are formed as in the disclosed embodiments (FIG. 3) is hot-pressed, an oxide layer is formed in the portions in which the cracks were present before the hot pressing is performed (FIG. 4). Even when the Zn-based alloy coated layer becomes melted and liquefied due to the heating performed prior to the hot pressing, large irregularities are not formed all over the Zn-based alloy coated layer because the oxide layer splits the intermetallic compound phase. Therefore, a hot-pressed member that includes a flat Zn-based alloy coated layer when viewed as a whole can be produced.

In the case where the hot-pressed member according to the disclosed embodiments is subjected to a zirconium-based chemical conversion treatment and electrodeposition coating and the post-coating corrosion resistance is determined, red rust is not formed locally at the common portions in which cross-cut is not formed since the electrodeposition coating has a uniform thickness. Thus, excellent post-coating corrosion resistance can be achieved.

In the case where the Zn-based alloy coated layer of the steel sheet does not have cracks formed therein, large irregularities are formed in the surface of the Zn-based alloy coated layer during heating. Furthermore, the oxide layer cannot follow the deformation thereof and may detach. The portion from which the oxide layer has detached has poorer reactivity with a zirconium-based chemical conversion coating liquid than other portions in which the oxide layer is present. Therefore, the coverage of the zirconium-based chemical conversion coating over the portion from which the oxide layer has detached is reduced, and red rust may be formed in the portion that is not covered with the chemical conversion coating. In contrast, since the oxide layer included in the hot-pressed member according to the disclosed embodiments is flat, the detachment of the oxide layer due to the deformation caused by heating does not occur. Therefore, the entire surface of the hot-pressed member can be uniformly covered with a zirconium-based chemical conversion coating and the formation of red rust due to the detachment of the oxide layer does not occur as described above.

Moreover, in the case where the Zn-based alloy coated layer of the steel sheet does not have cracks formed therein, when the Zn-based alloy coated layer becomes melted by heating, the liquid Zn-based alloy coated layer can freely flow between the oxide layer and the steel sheet. This promotes the diffusion of Zn included in the Zn-based alloy coated layer into the steel sheet and increases the thickness of the solid solution phase that is to be formed. In contrast, in the case where the Zn-based alloy coated layer of the steel sheet has the cracks formed therein as in the disclosed embodiments, even when the Zn-based alloy coated layer becomes melted by heating, the movement of the liquid Zn-based alloy coated layer is limited and the liquid Zn-based alloy coated layer keeps remaining at the original position because it is surrounded by the oxide layer. This limits the amount of Zn included in the Zn-based alloy coated layer and diffused into the steel sheet. Consequently, the formation of the solid solution phase is reduced and the amount of the residual intermetallic compound phase is increased. Since the intermetallic compound phase has a higher Zn content than the solid solution phase, the post-coating corrosion resistance can be further enhanced.

For the above reasons, the presence of the oxide layer according to the disclosed embodiments markedly enhances the post-coating corrosion resistance.

Next, the reasons for which the hydrogen release property can be enhanced when a hot-pressed member is produced using a steel sheet provided with a Zn-based alloy coated layer having cracks formed therein are described below.

In the case where a steel sheet provided with a Zn-based alloy coated layer is used as a steel sheet for hot pressing, hydrogen inevitably enters the base steel sheet in the production process due to, for example, the incorporation of the hydrogen gas produced in the electroplated coating liquid or the contact with water vapor included in the atmosphere which occurs subsequent to electroplated coating.

In the case where the Zn-based alloy coated layer of the steel sheet does not have cracks formed therein, the hydrogen that has entered the steel sheet is released through the Zn-based alloy coated layer in the temperature-rise process conducted by heating prior to the hot pressing. However, the channel through which the hydrogen is released is limited to the channel that passes through the intermetallic compound phase and it is not always possible to release the hydrogen with efficiency.

In contrast, in the case where the Zn-based alloy coated layer of the steel sheet has cracks formed therein, in addition to the above-described hydrogen release channel, hydrogen can be released through the cracks in the early stages of the temperature-rise process. This enables the hydrogen that has entered the steel sheet in the production of the steel sheet to be released with efficiency. It is considered that, in the case where a barrier layer (or coated layer) or the like, which inhibits the release of hydrogen, is absent on the surface of the steel sheet, or heating is performed to a sufficient degree over a long period of time, that is, for example, for 1 hour or more, the diffusible hydrogen included in the steel sheet is released commonly in a low-temperature range of 300° C. to 350° C. For the above reasons, a steel sheet provided with a Zn-based alloy coated layer having cracks formed therein has an enhanced hydrogen release property in a low-temperature range.

It is also known that, in the temperature-rise process conducted in the hot pressing step, the water vapor included in the atmosphere inside the furnace reacts with the steel sheet or coated layer and, consequently, hydrogen becomes incorporated into the steel in a high-temperature range of 400° C. or more. For reducing the likelihood of hydrogen entering the steel sheet in the above high-temperature range, it is effective to form a barrier layer, such as an oxide. In a steel sheet for hot pressing which includes a Zn-based alloy coated layer having cracks formed therein, in addition to the oxide layer formed as an uppermost layer in a crosswise manner, an oxide layer is formed at positions which correspond to the positions at which the cracks are present. Such an oxide layer virtually increases the thickness of the oxide layer that serves as a barrier layer for hydrogen entry. The presence of the above-described oxide layer reduces the hydrogen entry in the high-temperature range. Consequently, a hot-pressed member resistant to delayed fracture can be produced.

In the hot-pressed member according to the disclosed embodiments, the split density in at least one cross-section of the oxide layer per unit cross-section is 10 split positions/mm or more. If the split density in at least one cross-section of the oxide layer per unit cross-section is less than 10 split positions/mm, the above-described advantageous effects are not produced and the post-coating corrosion resistance and the hydrogen release property, which is described above, cannot be enhanced to a sufficient degree. In order to enhance the post-coating corrosion resistance and hydrogen release property, the above split density per unit cross-section is preferably 50 split positions/mm or more and is more preferably 100 split positions/mm or more. The upper limit for the above split density per unit cross-section is not set. Since an excessive increase in the above split density per unit cross-section requires an increase in the amount of time during which the immersion in an acidic aqueous solution is performed and results in a reduction in the production efficiency and increases in the production costs, the above split density per unit cross-section is preferably 300 split positions/mm or less and is more preferably 200 split positions/mm or less.

The expression "at least one cross-section of the oxide layer" used above refers to a cross-section of at least one of the oxide layers that split the intermetallic compound phase of the Zn-based alloy coated layer over the entire thickness and that are perpendicular to the surface of the Zn-based alloy coated layer. The above split density can be determined by the method described in Examples below.

In the hot-pressed member according to the disclosed embodiments, the split densities in two orthogonal cross-sections of the oxide layer per unit cross-section are preferably both 10 split positions/mm or more. As described above, the presence of the oxide layer according to the disclosed embodiments enhances the post-coating corrosion resistance and the hydrogen release property by the following mechanisms: a reduction in the formation of irregularities by splitting of the coated layer, a reduction in detachment of the oxide layer by the reduction in the formation of irregularities, an increase in the amount of remaining intermetallic compound phase by splitting of the coated layer, an increase in the number of hydrogen release channels, and the like. The oxide layer according to the disclosed embodiments enhances the post-coating corrosion resistance and hydrogen release property with further effect in the case where the oxide layer is present at a density of 10 split positions/mm or more in each of the two orthogonal cross-sections, compared with the case where the oxide layer is present at a density of 10 split positions/mm or more only in one cross-section. Thus, in the hot-pressed member according to the disclosed embodiments, the split densities in two orthogonal cross-sections of the oxide layer per unit cross-section are preferably both 10 split positions/mm or more. The above split densities in the two cross-sections are preferably both 50 split positions/mm or more and are more preferably both 100 split positions/mm or more. For the same reasons as above, the above split densities in the two cross-sections are preferably both 300 split positions/mm or less and are more preferably both 200 split positions/mm or less.

The expression "two orthogonal cross-sections of the oxide layer" used above refers to two cross-sections of the oxide layer which split the intermetallic compound phase of the Zn-based alloy coated layer over the entire thickness, which are perpendicular to the surface of the Zn-based alloy coated layer, and which are orthogonal to each other, that is, a cross-section taken in the rolling direction (L-direction) of the steel sheet and a cross-section taken in the direction (C-direction) perpendicular to the rolling direction. The above split densities in the two cross-sections can be determined by the method described in Examples below.

2) Steel Sheet for Hot Pressing

A steel sheet for hot pressing according to the disclosed embodiments includes a steel sheet and a Zn-based alloy coated layer disposed on at least one surface of the steel sheet, the Zn-based alloy coated layer including at least one element selected from Fe, Al, Mg, Si, Sr, Mn, Ti, Sn, In, Bi, Pb, and B with the balance being Zn and incidental impurities, the total content of the above elements being 0.1% to 60% by mass, the Zn-based alloy coated layer having a coating weight of 10 to 90 $g/m^2$. The Zn-based alloy coated layer has a crack formed therein, the crack splitting the Zn-based alloy coated layer, and the crack density in at least one cross-section of the Zn-based alloy coated layer per unit cross-section is 10 split positions/mm or more.

Since the Zn-based alloy coated layer includes at least one element selected from Fe, Al, Mg, Si, Sr, Mn, Ti, Sn, In, Bi, Pb, and B such that the total content of the above elements is 0.1 to 60% by mass, the melting point of the Zn-based alloy coated layer can be increased and, as a result, a hot-pressed member having excellent post-coating corrosion resistance can be produced. If the total content of the above elements is less than 0.1% by mass, the melting point of the Zn-based alloy coated layer cannot be increased to a sufficient degree. In such a case, the intermetallic compound phase may be dissipated by the heating performed prior to the hot pressing and, consequently, it becomes impossible to produce a hot-pressed member having the intended post-coating corrosion resistance. If the total content of the above elements is more than 60% by mass, the elution reaction of Zn caused by the acidic aqueous solution is suppressed and, as a result, it becomes difficult to form the cracks. In such a case, the hot-pressed member may have insufficient post-coating corrosion resistance and an insufficient hydrogen release property. The lower limit for the total content of the above elements is preferably 0.2% by mass or more and is more preferably 4% by mass or more. The upper limit for the total content of the above elements is preferably 55% by mass or less and is more preferably 15% by mass or less.

Examples of the above Zn-based alloy coated layer include a Zn—Fe electroplated coated layer, a hot-dip galvanized layer, an alloyed hot-dip galvanized layer, a hot-dip Zn—Al coated layer, and a hot-dip Zn—Al—Mg coated layer.

Limiting the coating weight of the Zn-based alloy coated layer to 10 to 90 $g/m^2$ enables the production of a hot-pressed member having excellent post-coating corrosion resistance and an excellent hydrogen release property. If the above coating weight is less than 10 $g/m^2$, the intermetallic compound phase becomes dissipated by the heating performed prior to the hot pressing and, consequently, it becomes impossible to produce a hot-pressed member having the intended post-coating corrosion resistance. If the coating weight exceeds 90 $g/m^2$, the effect of enhancing the post-coating corrosion resistance becomes saturated and there is no economy in terms of costs. Furthermore, the hydrogen release property may become degraded. In the case where the post-coating corrosion resistance is to be further enhanced, the coating weight is preferably set to 30 $g/m^2$ or more. The coating weight is preferably 80 $g/m^2$ or less. Note that the above coating weight is a coating weight per one side.

In the steel sheet for hot pressing according to the disclosed embodiments, the Zn-based alloy coated layer has a crack formed therein, the crack splitting the Zn-based alloy coated layer, and the crack density in at least one cross-section of the Zn-based alloy coated layer per unit cross-section is 10 split positions/mm or more.

In the steel sheet for hot pressing according to the disclosed embodiments, the term "crack", which splits the Zn-based alloy coated layer, refers to a crack formed in the direction perpendicular to the surface of the Zn-based alloy coated layer, that is, a crack formed so as to extend from the surface of the Zn-based alloy coated layer toward the base steel sheet. The width of the crack is set to 5 μm or less and is more preferably 2 μm or less in consideration of the post-coating corrosion resistance. The lower limit for the width of the crack is not set; the width of the crack is preferably 0.1 μm or more.

As described in detail in 1) above, the hot-pressed member according to the disclosed embodiments includes an oxide layer that serves as an uppermost layer of the Zn-based alloy coated layer and splits the intermetallic compound phase, and the split density in at least one cross-section of the oxide layer per unit cross-section is 10 split positions/mm or more. In order to produce such a hot-pressed member, the steel sheet for hot pressing according to the disclosed embodiments includes a Zn-based alloy coated layer having cracks formed therein, the cracks splitting the Zn-based alloy coated layer, and the crack density in at least one cross-section of the Zn-based alloy coated layer per unit cross-section is 10 split positions/mm or more. If the crack density in at least one cross-section of the Zn-based alloy coated layer per unit cross-section is less than 10 split positions/mm, the post-coating corrosion resistance and the hydrogen release property of the hot-pressed member cannot be enhanced to a sufficient degree. In order to enhance the post-coating corrosion resistance and the hydrogen release property, the above crack density per unit cross-section is preferably 50 split positions/mm or more and is more preferably 100 split positions/mm or more. Since an excessive increase in the above crack density per unit cross-section requires an increase in the amount of time during which the immersion in an acidic aqueous solution is performed and results in a reduction in the production efficiency and increases in the production costs, the above crack density per unit cross-section is preferably 300 split positions/mm or less and is more preferably 200 split positions/mm or less.

In the steel sheet for hot pressing according to the disclosed embodiments, the crack densities in two orthogonal cross-sections of the Zn-based alloy coated layer per unit cross-section are preferably both 10 split positions/mm or more. As described in 1) above, the oxide layer of the hot-pressed member according to the disclosed embodiments enhances the post-coating corrosion resistance and hydrogen release property with further effect in the case where the oxide layer is present at a density of 10 split positions/mm or more in each of the two orthogonal cross-sections, compared with the case where the oxide layer is present at a density of 10 split positions/mm or more only in one cross-section. Thus, also in the steel sheet for hot pressing according to the disclosed embodiments, the crack densities in two orthogonal cross-sections of the Zn-based alloy coated layer per unit cross-section are preferably both 10 split positions/mm or more. The above crack densities in the two cross-sections are preferably both 50 split positions/mm or more and are more preferably both 100 split positions/mm or more. For the same reasons as above, the above crack densities in the two cross-sections are preferably both 300 split positions/mm or less and are more preferably both 200 split positions/mm or less.

The term "crack" used in the disclosed embodiments refers to a crack formed by performing an intended crack formation treatment as described in 3) below. Thus, cracks and the like formed in the preparation of a test specimen for the observation of a cross-section are not considered as "crack".

The Zn-based alloy coated layer according to the disclosed embodiments may be a Zn-based alloy coated layer constituted by a single layer. The Zn-based alloy coated layer may optionally include a primary coating depending on the intended purpose without impairing the advantageous effects of the disclosed embodiments. Examples of the primary coating include a primary coated layer composed mainly of Ni.

In the disclosed embodiments, in order to produce a hot-pressed member having a strength higher than 1470 MPa-grade subsequent to the hot pressing, for example, a steel sheet having a chemical composition containing, % by mass, C: 0.20% to 0.35%, Si: 0.1% to 0.5%, Mn: 1.0% to 3.0%, P: 0.02% or less, S: 0.01% or less, Al: 0.1% or less, and N: 0.01% or less with the balance being Fe and incidental impurities can be used as a base steel sheet for the Zn-based alloy coated layer. The steel sheet may be either a cold-rolled or hot-rolled steel sheet. The reasons for the limitations on the components are described below.

C: 0.20% to 0.35%

C forms martensite and the like as steel microstructures and thereby increases strength. The C content needs to be 0.20% or more in order to achieve a strength higher than a 1470 MPa-grade. However, if the C content exceeds 0.35%, the toughness of a spot weld becomes degraded. Accordingly, the C content is preferably 0.20% to 0.35%.

Si: 0.1% to 0.5%

Si is an element effective for strengthening steel and enhancing steel quality. In order to produce the above advantageous effects, the Si content needs to be 0.1% or more. However, if the Si content exceeds 0.5%, stabilization of ferrite occurs, which degrades hardenability. Accordingly, the Si content is preferably 0.1% to 0.5%.

Mn: 1.0% to 3.0%

Mn is an element effective for strengthening steel. For maintaining intended mechanical properties and an intended strength, the Mn content needs to be 1.0% or more. However, if the Mn content exceeds 3.0%, the amount of Mn concentrated at the surface during annealing is increased and, consequently, it becomes difficult to maintain the adhesion of coating. Accordingly, the Mn content is preferably 1.0% to 3.0%.

P: 0.02% or Less

If the P content exceeds 0.02%, P segregates at austenite grain boundaries during casting to cause grain boundary embrittlement, which results in the degradation of local ductility and thereby impairs the balance between strength and ductility. Accordingly, the P content is preferably 0.02% or less. The lower limit for the P content is not set. However, an excessive reduction in the P content leads to increases in costs. Therefore, the P content is preferably 0.001% or more.

S: 0.01% or Less

S forms an inclusion such as MnS and thereby causes degradation of impact resistance or cracking along the metal flow in a weld. Therefore, it is desirable to minimize the S content. The S content is preferably 0.01% or less. In order to maintain suitable stretch flangeability, the S content is more preferably 0.005% or less. The lower limit for the S content is not set. However, an excessive reduction in the S content leads to increases in costs. Therefore, the S content is preferably 0.0001% or more.

Al: 0.1% or Less

If the Al content exceeds 0.1%, the blanking workability and hardenability of the material, that is, the steel sheet, become degraded. Accordingly, the Al content is preferably 0.1% or less. The lower limit for the Al content is not set. However, if the Al content is low, the deoxidization of molten steel is reduced and, consequently, the uniformity and mechanical properties of the material become degraded. Thus, the Al content is preferably 0.001% or more.

N: 0.01% or Less

If the N content exceeds 0.01%, a nitride (AlN) is formed during the hot rolling or the heating performed prior to the hot pressing and, as a result, the blanking workability and hardenability of the material, that is, the steel sheet, become degraded. Accordingly, the N content is preferably 0.01% or less. The lower limit for the N content is not set. However, an excessive reduction in the N content leads to increases in costs. Therefore, the N content is preferably 0.0001% or more.

Furthermore, in the disclosed embodiments, in addition to the above-described fundamental components, at least one element selected from Nb: 0.05% or less, Ti: 0.05% or less, B: 0.0002% to 0.005%, Cr: 0.1% to 0.3%, and Sb: 0.003% to 0.03% can be used as needed in order to further improve the properties of the steel sheet.

Nb: 0.05% or Less

Nb is a component effective for strengthening steel. However, an excessive addition of Nb degrades shape fixability. Accordingly, in the case where Nb is used, the Nb content is limited to 0.05% or less. The lower limit for the Nb content is not set. However, if the Nb content is low, the intended steel strengthening effect cannot be produced. Thus, the Nb content is preferably 0.001% or more.

Ti: 0.05% or Less

Similarly to Nb, Ti is also effective for strengthening steel and an excessive addition of Ti degrades shape fixability. Accordingly, in the case where Ti is used, the Ti content is limited to 0.05% or less. The lower limit for the Ti content is not set. However, if the Ti content is low, the intended steel strengthening effect cannot be produced. Thus, the Ti content is preferably 0.001% or more.

B: 0.0002% to 0.005%

B suppresses the formation of ferrite at austenite grain boundaries and growth of ferrite. Thus, the B content is preferably 0.0002% or more. However, an excessive addition of B significantly degrades formability. Accordingly, in the case where B is used, the B content is limited to 0.0002% to 0.005%.

Cr: 0.1% to 0.3%

Cr is effective for strengthening steel and enhancing hardenability. In order to produce the above advantageous effects, the Cr content is preferably 0.1% or more. However, if the Cr content exceeds 0.3%, the costs are significantly increased because of high alloy costs. Accordingly, in the case where Cr is used, the Cr content is limited to 0.1% to 0.3%.

Sb: 0.003% to 0.03%

Sb also suppresses the decarbonization of the surface layer of the steel sheet during the hot-pressing process. In order to produce the above advantageous effects, the Sb content needs to be 0.003% or more. However, if the Sb content exceeds 0.03%, the rolling load is increased and the productivity becomes degraded. Accordingly, in the case where Sb is used, the Sb content is limited to 0.003% to 0.03%.

The other component, that is, the balance, includes Fe and incidental impurities.

3) Method for Producing Steel Sheet for Hot Pressing

In the disclosed embodiments, a steel sheet for hot pressing which has the intended crack density can be produced by immersing a steel sheet provided with a Zn-based alloy coated layer disposed on at least one surface of the steel sheet, the Zn-based alloy coated layer including at least one element selected from Fe, Al, Mg, Si, Sr, Mn, Ti, Sn, In, Bi, Pb, and B with the balance being Zn and incidental impurities, the total content of the above elements being 0.1% to 60% by mass, the Zn-based alloy coated layer having a coating weight of 10 to 90 $g/m^2$, in an acidic aqueous solution having a pH of 4.0 or less for 1.5 seconds or more, or applying a strain to the Zn-based alloy coated layer of the steel sheet.

Examples of the above Zn-based alloy coated layer include a Zn—Fe electroplated coated layer, a hot-dip galvanized layer, an alloyed hot-dip galvanized layer, a hot-dip Zn—Al coated layer, and a hot-dip Zn—Al—Mg coated layer.

In the case where a Zn—Fe electroplated coated layer is formed as a Zn-based alloy coated layer, Zn—Fe electroplated coating can be performed using a plating solution that includes 200 g/L of zinc sulfate heptahydrate and 240 g/L of ferrous sulfate heptahydrate and has a pH of 1.5 and a bath temperature of 50° C. at a current density of 50 $A/dm^2$.

In the case where a hot-dip galvanized layer is formed as a Zn-based alloy coated layer, hot-dip galvanizing can be performed by immersing the steel sheet in a plating bath that includes 0.2% Al with the balance being Zn and incidental impurities and has a bath temperature of 460° C. for 2 seconds.

In the case where an alloyed hot-dip galvanized layer is formed as a Zn-based alloy coated layer, alloyed hot-dip galvanizing can be performed by immersing the steel sheet in a hot-dip Zn plating bath having a bath temperature of 460° C. for 2 seconds and then performing an alloying treatment at an alloying temperature of 500° C. for 15 seconds.

In the case where a hot-dip Zn—Al coated layer is formed as a Zn-based alloy coated layer, hot-dip Zn—Al coating can be performed by immersing the steel sheet in a plating bath that includes 5% Al with the balance being Zn and incidental impurities and has a bath temperature of 500° C. or a plating bath that includes 55% Al with the balance being Zn and incidental impurities and has a bath temperature of 600° C. for 2 seconds.

In the case where a hot-dip Zn—Al—Mg coated layer is formed as a Zn-based alloy coated layer, hot-dip Zn—Al—Mg coating can be performed by immersing the steel sheet in a plating bath that includes 4.5% Al and 0.5% Mg with the balance being Zn and incidental impurities and has a bath temperature of 500° C. for 2 seconds.

If the pH of the acidic aqueous solution exceeds 4.0, the etching ability thereof becomes degraded, the crack formation effect is reduced, and it becomes impossible to achieve the intended crack density. Therefore, the pH of the acidic aqueous solution is limited to 4.0 or less. The pH of the acidic aqueous solution is preferably 2.0 or less. In order to prevent excessive etching, the pH of the acidic aqueous solution is preferably 1.0 or more. If the amount of time during which the steel sheet is immersed in the acidic aqueous solution is less than 1.5 seconds, etching also does not occur to a sufficient degree, the crack formation effect is reduced, and it becomes impossible to achieve the intended crack density. Therefore, the amount of time during which the steel sheet is immersed in the acidic aqueous solution is limited to 1.5 seconds or more. The amount of time during which the steel sheet is immersed in the acidic aqueous solution is preferably 2.0 seconds or more. The upper limit for the above immersion time is not set. In order to prevent excessive etching, the above immersion time is preferably 20 seconds or less and is more preferably 15 seconds or less.

In particular, in the disclosed embodiments, a steel sheet for hot pressing in which the crack densities in two orthogonal cross-sections of the Zn-based alloy coated layer per unit cross-section are both 10 split positions/mm or more can be produced by immersing the steel sheet in an acidic aqueous solution having a pH of 4.0 or less for 1.5 seconds or more. Examples of the acidic aqueous solution that can be used in the disclosed embodiments include acidic aqueous solutions such as hydrochloric acid and sulfuric acid.

In the disclosed embodiments, the acidic aqueous solution is preferably the plating solution used for forming the Zn-based alloy coated layer. The plating solution used for forming the Zn-based alloy coated layer is commonly an acidic aqueous solution having a pH of 4.0 or less. Therefore, when the steel sheet is immersed in the plating solution that has been used for forming the Zn-based alloy coated layer, the formation of the Zn-based alloy coated layer and the formation of cracks can be done using one liquid. This is advantageous in terms of costs.

Examples of the plating solution used for forming the Zn-based alloy coated layer in the disclosed embodiments include a plating solution that includes 200 g/L of zinc sulfate heptahydrate and 240 g/L of ferrous sulfate heptahydrate and has a pH of 1.5 and a bath temperature of 50° C., which is used for forming a Zn—Fe electroplated coated layer.

In the disclosed embodiments, a steel sheet for hot pressing which has the intended crack density can also be produced by applying a strain to the Zn-based alloy coated layer of the steel sheet. Examples of the crack formation treatment in which the application of a strain is used include uniaxial stretching. The amount of strain is preferably 2% or more. In order to prevent an excessive increase in the width of the cracks, the amount of strain is preferably 10% or less. The method with which uniaxial stretching is performed is not limited. For example, subsequent to the formation of the Zn-based alloy coated layer, the tension applied in the rolling direction of the steel sheet may be increased in a specific segment of the steel sheet manufacturing line in order to apply a strain to the steel sheet.

4) Method for Producing Hot-Pressed Member

In the disclosed embodiments, a hot-pressed member having the intended split density can be produced by heating the steel sheet for hot pressing produced by the method described in 3) above to a temperature range of the $Ac_3$ transformation temperature to 1000° C. and subsequently performing hot pressing. Alternatively, a hot-pressed member having the intended split density can be produced by heating a steel sheet (steel sheet for hot pressing) to a temperature range of the $Ac_3$ transformation temperature to 1000° C. and subsequently performing hot pressing, the steel sheet being provided with a Zn-based alloy coated layer disposed on at least one surface of the steel sheet, the Zn-based alloy coated layer including at least one element selected from Fe, Al, Mg, Si, Sr, Mn, Ti, Sn, In, Bi, Pb, and B with the balance being Zn and incidental impurities, the total content of the above elements being 0.1% to 60% by mass, the Zn-based alloy coated layer having a coating weight of 10 to 90 g/m$^2$, wherein the Zn-based alloy coated layer has a crack formed therein, the crack splitting the Zn-based alloy coated layer, and the crack density in at least one cross-section of the Zn-based alloy coated layer per unit cross-section is 10 split positions/mm or more.

Limiting the heating temperature of the steel sheet for hot pressing to fall within a range of the $Ac_3$ transformation temperature to 1000° C. enables the formation of the Zn-based alloy coated layer that includes the solid solution phase, the intermetallic compound phase, and the oxide layer which are described in 1) above. If the above heating temperature is lower than the $Ac_3$ transformation temperature, the strength necessary for the hot-pressed member may fail to be achieved. On the other hand, if the heating temperature exceeds 1000° C., the intermetallic compound phase included in the Zn-based alloy coated layer may become dissipated. The above heating temperature is preferably 800° C. or more and 950° C. or less. In the disclosed embodiments, the $Ac_3$ transformation temperature is calculated using thermodynamics computational software "Thermo-Calc".

The amount of time during which holding is performed at the above heating temperature is not limited. In order to maximize the amount of the remaining intermetallic compound phase and further enhance the post-coating corrosion resistance and to prevent the hydrogen entry caused as a result of the water vapor present inside the furnace being incorporated into the steel during the holding time, the above holding time is preferably 3 minutes or less, is more preferably 1 minute or less, and is further preferably 0 minute.

The method for heating the steel sheet for hot pressing is not limited. Examples thereof include furnace heating in which an electric furnace or a gas furnace is used, Joule heating, induction heating, high-frequency heating, and flame heating.

Subsequent to the heating, hot-pressing is performed. Then, cooling is performed using a die and a coolant, such as water, simultaneously with or subsequent to the hot-pressing. Hereby, a hot-pressed member is produced. In the disclosed embodiments, the hot-pressing conditions are not limited. The pressing can be performed in a temperature range of 600° C. to 800° C., which is a common temperature range for hot pressing.

Example 1

The disclosed embodiments are specifically described on the basis of Examples below. Examples below do not limit the disclosed embodiments. Various modifications within the summary may be made without departing from the scope of the disclosed embodiments.

The base steel sheets used were cold rolled steel sheets that had a chemical composition containing, % by mass, C: 0.33%, Si: 0.25%, Mn: 1.9%, P: 0.005%, S: 0.001%, Al: 0.03%, N: 0.004%, Nb: 0.02%, Ti: 0.02%, B: 0.002%, Cr: 0.2%, and Sb: 0.008%, with the balance being Fe and incidental impurities and a thickness of 1.4 mm ($Ac_3$ transformation temperature=730° C.).

The above base steel sheets were subjected to electrogalvanizing, Zn—Fe electroplated coating (Fe: 13%), hot-dip galvanizing (Al: 0.2%), alloyed hot-dip galvanizing (Fe: 10%), hot-dip Zn—Al coating (Al: 5%), hot-dip Zn—Al—Mg coating (Al: 4.5%, Mg: 0.5%), or hot-dip Zn—Al coating (Al: 55%) to form various types of Zn-based alloy coated layers on the base steel sheets.

In the Zn—Fe electroplated coating (Fe: 13%), hot-dip galvanizing (Al: 0.2%), alloyed hot-dip galvanizing (Fe: 10%), hot-dip Zn—Al coating (Al: 5%), hot-dip Zn—Al—Mg coating (Al: 4.5%, Mg: 0.5%), and hot-dip Zn—Al coating (Al: 55%), coated layers were formed by the above-described methods. In electrogalvanizing, a coated layer was formed by performing electroplated coating using a plating solution including 440 g/L of zinc sulfate heptahydrate and having a pH of 1.5 and a bath temperature of 50° C. at a current density of 50 A/dm$^2$.

Table 1 lists the contents of the elements in each of the Zn-based alloy coated layers and the coating weight of the Zn-based alloy coated layer. The elements included in the Zn-based alloy coated layers which are listed in Table 1 are elements other than the balance (Zn and incidental impurities).

The steel sheets prepared as described above were each treated by any of the following methods to form cracks in the Zn-based alloy coated layer. In each of the methods, the crack formation treatment was performed under the conditions described in Table 1.
- A: Treatment in which the steel sheet was immersed in a plating solution having the above bath composition
- B: Treatment in which the steel sheet was immersed in hydrochloric acid
- C: Treatment in which the steel sheet was uniaxially stretched in the rolling direction such that the amount of strain was 5%

Note that, in the treatment C above, a strain of 5% was applied also to the coated layer.

A cross-section of the Zn-based alloy coated layer of each of the steel sheets for hot pressing was observed, and the crack density was measured. Specifically, a cross-section of the Zn-based alloy coated layer was inspected with a scanning electron microscope (SEM) at a 500-fold magnification, and a conversion to crack density per unit cross-sectional length (position/mm) was performed. In this step, in order to increase the accuracy of measurement of crack density, the cross-section was observed in three fields of view per a sample, and the average thereof was used as crack density. The measurement of crack density was conducted in two cross-sections: a cross-section taken in the rolling direction (L-direction) of the steel sheet and a cross-section taken in the direction (C-direction) perpendicular to the rolling direction. Table 1 lists the crack density.

Subsequently, the steel sheets for hot pressing were hot-pressed. Specifically, a 150 mm×300 mm test specimen was taken from each of the steel sheets for hot pressing and subjected to a heat treatment with an electric furnace. Table 1 lists the heat treatment conditions (heating temperature and holding time). After the heat treatment, the test specimen was removed from the electric furnace and then hot-pressed with a hat-shaped die at a forming-start temperature of 700° C. to form a hot-pressed member. The hot-pressed member had the following shape: the length of the flat portion on the upper surface: 100 mm, the length of the flat portion on the side surface: 50 mm, and the length of the flat portion on the lower surface: 50 mm. The bend R values (curvature radii) of the die used at both shoulders of the upper surface and both shoulders of the lower surface were all 7R.

Using each of the hot-pressed members, the identification of phase structure of the coated layer, measurement of the split density in the oxide layer, evaluation of post-coating corrosion resistance, and evaluation of a hydrogen release property were conducted.

<Phase Structure of Coated Layer and Split Density in Oxide Layer>

The phase structure (solid solution phase, intermetallic compound phase, and oxide layer) of the coated layer of each of the hot-pressed members was identified. Specifically, the presence or absence of each of the solid solution phase, the intermetallic compound phase, and the oxide layer was determined by X-ray diffractometry, and the positions at which the above phases were present were confirmed with a scanning electron microscope (SEM). In the case where the position at which the phase was present was confirmed, "○ Yes" is shown in the column of the phase in Table 1, while "x No" is shown in the column of the phase in Table 1 in the case where the position at which the phase was present was not confirmed.

A test specimen for cross-section observation was taken from the flat portion of the upper surface of each of the hot-pressed members, and a cross-section was inspected to measure the split density in the oxide layer. Specifically, a cross-section of the Zn-based alloy coated layer of each of the hot-pressed members was inspected with a scanning electron microscope (SEM) at a 500-fold magnification, and a conversion to the above split density per unit cross-section (position/mm) was performed. In this step, in order to increase the accuracy of measurement of split density in the oxide layer, the cross-section was observed in three fields of view per a sample, and the average thereof was used as split density. The measurement of split density was conducted in two cross-sections: a cross-section taken in the rolling direction (L-direction) of the steel sheet and a cross-section taken in the direction (C-direction) perpendicular to the rolling direction. Table 1 lists the results of measurement of the split density in the oxide layer.

<Post-Coating Corrosion Resistance>

In order to determine the post-coating corrosion resistance, a 70 mm×150 mm test specimen was cut from the flat portion of the upper surface of each of the hot-pressed members. The test specimen was subjected to a zirconium-based chemical conversion treatment and electrodeposition coating. The zirconium-based chemical conversion treatment was performed under common conditions using "PLM2100" produced by Nihon Parkerizing Co., Ltd. Electrodeposition coating was performed using "GT100V" produced by Kansai Paint Co., Ltd. such that a coating having a thickness of 10 µm was formed. As for the baking conditions, holding was performed at 170° C. for 20 minutes. The hot-pressed member that had been subjected to the zirconium-based chemical conversion treatment and the electrodeposition coating was then subjected to a corrosion test (SAE-J2334). The state of corrosion after 30 cycles was evaluated.

In the evaluation of cross-cut portions, one-side maximum swelling width from the cross-cut was measured and evaluated in accordance with the following criteria. Among the symbols below, "⊚" and "○" are considered passed. Table 2 lists the evaluation results.
- ⊚: One-side maximum swelling width<1.5 mm
- ○: 1.5 mm≤One-side maximum swelling width<3.0 mm
- Δ: 3.0 mm≤One-side maximum swelling width<4.0 mm
- x: 4.0 mm≤One-side maximum swelling width In the evaluation of common portions in which cross-cut was not present, evaluation was made in accordance with the following criteria. Among the symbols below, "⊚" and "○" are considered passed. Table 2 lists the evaluation results.
- ⊚: Red rust was absent in common portions
- ○: 1≤Number of positions at which red rust was formed<3
- Δ: 3≤Number of positions at which red rust was formed<10
- x: 10≤Number of positions at which red rust was formed <Measurement of Hydrogen Content in Hot-Pressed Member>

The hydrogen content in each of the hot-pressed members was measured by gas chromatography. In the gas chromatography, the heating rate was set to 200° C./h and the target temperature was set to 300° C. The term "hydrogen content" used herein refers to the cumulative content of the hydrogen released from the steel in a temperature range of room temperature to 300° C. The hydrogen content was calculated by integrating the contents of hydrogen released at respective temperatures.

The evaluation was made in accordance with the following criteria. Among the symbols below, "⊚" and "○" were considered passed. Table 2 lists the evaluation results.
- ⊚: Hydrogen content in hot-pressed member<0.10 ppm
- ○: 0.10≤ppm Hydrogen content in hot-pressed member<0.15 ppm
- Δ: 0.15≤ppm Hydrogen content in hot-pressed member<0.20 ppm
- x: 0.20 ppm≤Hydrogen content in hot-pressed member

TABLE 1

| | Steel sheet for hot pressing | | | | | | |
|---|---|---|---|---|---|---|---|
| | | | | Crack formation treatment | | Crack density | |
| No. | Coating type | Content (mass %) | Coating weight (g/m²) | Method | pH | Immersion time (sec) | L-direction (split positions/mm) | C-direction (split positions/mm) |
| 1 | EZF | Fe: 13 | 70 | B | 1.4 | 5.0 | 120 | 120 |
| 2 | GI | Al: 0.2 | 70 | B | 1.4 | 5.0 | 140 | 140 |
| 3 | GA | Fe: 10 | 70 | B | 1.4 | 5.0 | 120 | 120 |
| 4 | GF | Al: 5 | 70 | B | 1.4 | 5.0 | 120 | 120 |
| 5 | GFM | Al: 4.5, Mg: 0.5 | 70 | B | 1.4 | 5.0 | 120 | 120 |
| 6 | GL | Al: 55 | 70 | B | 1.4 | 5.0 | 120 | 120 |
| 7 | EZF | Fe: 13 | 10 | B | 1.4 | 5.0 | 160 | 160 |
| 8 | EZF | Fe: 13 | 30 | B | 1.4 | 5.0 | 140 | 140 |
| 9 | EZF | Fe: 13 | 90 | B | 1.4 | 5.0 | 100 | 100 |
| 10 | EZF | Fe: 13 | 70 | B | 1.4 | 2.0 | 15 | 15 |
| 11 | EZF | Fe: 13 | 70 | B | 1.4 | 10.0 | 130 | 130 |
| 12 | EZF | Fe: 13 | 70 | B | 1.4 | 15.0 | 150 | 150 |
| 13 | EZF | Fe: 13 | 70 | A | 1.4 | 5.0 | 120 | 120 |
| 14 | EZF | Fe: 13 | 70 | C | — | — | 50 | 0 |
| 15 | EZF | Fe: 13 | 70 | B | 3.5 | 5.0 | 60 | 60 |
| 16 | EZF | Fe: 13 | 70 | B | 2.0 | 5.0 | 80 | 80 |
| 17 | EZF | Fe: 13 | 70 | B | 1.0 | 5.0 | 100 | 100 |
| 18 | EZF | Fe: 13 | 70 | B | 1.4 | 5.0 | 120 | 120 |
| 19 | EZF | Fe: 13 | 70 | B | 1.4 | 5.0 | 120 | 120 |
| 20 | EZF | Fe: 13 | 70 | B | 1.4 | 5.0 | 120 | 120 |
| 21 | EZF | Fe: 13 | 70 | B | 1.4 | 5.0 | 120 | 120 |
| 22 | EG | — | 70 | B | 1.4 | 5.0 | 150 | 150 |
| 23 | EZF | Fe: 13 | 5 | B | 1.4 | 5.0 | 170 | 170 |
| 24 | EZF | Fe: 13 | 70 | B | 1.4 | 1.0 | 8 | 8 |
| 25 | EZF | Fe: 13 | 70 | B | 4.5 | 2.0 | 8 | 8 |
| 26 | EZF | Fe: 13 | 70 | — | — | — | 0 | 0 |

| | Hot-pressed member | | | | | |
|---|---|---|---|---|---|---|
| | Heat treatment prior to hot pressing | | | | | Split density in oxide layer | |
| No. | Heating temperature (°C.) | Holding time (min) | Solid solution phase | Intermetallic compound phase | Oxide layer | L-direction (split positions/mm) | C-direction (split positions/mm) |
| 1 | 900 | 0 | ○ Yes | ○ Yes | ○ Yes | 120 | 120 |
| 2 | 900 | 0 | ○ Yes | ○ Yes | ○ Yes | 140 | 140 |
| 3 | 900 | 0 | ○ Yes | ○ Yes | ○ Yes | 120 | 120 |
| 4 | 900 | 0 | ○ Yes | ○ Yes | ○ Yes | 120 | 120 |
| 5 | 900 | 0 | ○ Yes | ○ Yes | ○ Yes | 120 | 120 |
| 6 | 900 | 0 | ○ Yes | ○ Yes | ○ Yes | 120 | 120 |
| 7 | 900 | 0 | ○ Yes | ○ Yes | ○ Yes | 160 | 160 |
| 8 | 900 | 0 | ○ Yes | ○ Yes | ○ Yes | 140 | 140 |
| 9 | 900 | 0 | ○ Yes | ○ Yes | ○ Yes | 100 | 100 |
| 10 | 900 | 0 | ○ Yes | ○ Yes | ○ Yes | 15 | 15 |
| 11 | 900 | 0 | ○ Yes | ○ Yes | ○ Yes | 130 | 130 |
| 12 | 900 | 0 | ○ Yes | ○ Yes | ○ Yes | 150 | 150 |
| 13 | 900 | 0 | ○ Yes | ○ Yes | ○ Yes | 120 | 120 |
| 14 | 900 | 0 | ○ Yes | ○ Yes | ○ Yes | 50 | 0 |
| 15 | 900 | 0 | ○ Yes | ○ Yes | ○ Yes | 60 | 60 |
| 16 | 900 | 0 | ○ Yes | ○ Yes | ○ Yes | 80 | 80 |
| 17 | 900 | 0 | ○ Yes | ○ Yes | ○ Yes | 100 | 100 |
| 18 | 800 | 0 | ○ Yes | ○ Yes | ○ Yes | 120 | 120 |
| 19 | 950 | 0 | ○ Yes | ○ Yes | ○ Yes | 120 | 120 |
| 20 | 900 | 1 | ○ Yes | ○ Yes | ○ Yes | 120 | 120 |
| 21 | 900 | 3 | ○ Yes | ○ Yes | ○ Yes | 120 | 120 |
| 22 | 900 | 0 | ○ Yes | x No | ○ Yes | 150 | 150 |
| 23 | 900 | 0 | ○ Yes | x No | ○ Yes | 170 | 170 |

TABLE 1-continued

| 24 | 900 | 0 | ○ Yes | ○ Yes | ○ Yes | 8 | 8 |
| 25 | 900 | 0 | ○ Yes | ○ Yes | ○ Yes | 8 | 8 |
| 26 | 900 | 0 | ○ Yes | ○ Yes | ○ Yes | 0 | 0 |

EG: Electrogalvanizing
EZF: Zn-Fe electroplated coating (Fe: 13%)
GI: Hot-dip galvanizing (Al: 0.2%)
GA: Alloyed hot-dip galvanizing (Fe: 10%)
GF: Hot-dip Zn-Al coating (Al: 5%)
GFM: Hot-dip Zn-Al-Mg coating (Al: 4.5% and Mg: 0.5%)
GL: Hot-dip Zn-Al coating (Al: 55%)

TABLE 2

| | Evaluation results | | | |
|---|---|---|---|---|
| | Post-coating corrosion resistance | | Hydrogen content in | |
| No. | Cross-cut portion | Common portion | hot-pressed member | Remarks |
| 1 | ◎ | ◎ | ◎ | Example |
| 2 | ◎ | ◎ | ◎ | Example |
| 3 | ◎ | ◎ | ◎ | Example |
| 4 | ◎ | ◎ | ◎ | Example |
| 5 | ◎ | ◎ | ◎ | Example |
| 6 | ◎ | ◎ | ◎ | Example |
| 7 | ○ | ◎ | ◎ | Example |
| 8 | ◎ | ◎ | ◎ | Example |
| 9 | ◎ | ◎ | ○ | Example |
| 10 | ◎ | ○ | ○ | Example |
| 11 | ◎ | ◎ | ◎ | Example |
| 12 | ◎ | ◎ | ◎ | Example |
| 13 | ◎ | ◎ | ◎ | Example |
| 14 | ◎ | ○ | ○ | Example |
| 15 | ◎ | ◎ | ◎ | Example |
| 16 | ◎ | ◎ | ◎ | Example |
| 17 | ◎ | ◎ | ◎ | Example |
| 18 | ◎ | ◎ | ◎ | Example |
| 19 | ○ | ◎ | ◎ | Example |
| 20 | ○ | ◎ | ○ | Example |
| 21 | ○ | ◎ | ○ | Example |
| 22 | X | ○ | ◎ | Comparative example |
| 23 | X | ○ | ◎ | Comparative example |
| 24 | ◎ | Δ | Δ | Comparative example |
| 25 | ◎ | Δ | Δ | Comparative example |
| 26 | ◎ | X | X | Comparative example |

The results described in Table 2 confirm that the hot-pressed member according to the disclosed embodiments is excellent in terms of post-coating corrosion resistance and particularly excellent in terms of post-coating corrosion resistance when a zirconium-based chemical conversion treatment is performed. The hot-pressed member according to the disclosed embodiments also has an excellent hydrogen release property. A hot-pressed member excellent in terms of post-coating corrosion resistance and a hydrogen release property can be produced using the steel sheet for hot pressing according to the disclosed embodiments.

The invention claimed is:

1. A hot-pressed member comprising:
   a steel sheet; and
   a Zn-based alloy coated layer disposed on at least one surface of the steel sheet, the Zn-based alloy coated layer comprising:
   a solid solution phase including:
   Zn with the balance being Fe and incidental impurities, or
   Zn and at least one element selected from Al, Mg, Si, Sr, Mn, Ti, Sn, In, Bi, Pb, and B with the balance being Fe and incidental impurities;
   an intermetallic compound phase including:
   Fe with the balance being Zn and incidental impurities, or
   Fe and at least one element selected from Al, Mg, Si, Sr, Mn, Ti, Sn, In, Bi, Pb, and B with the balance being Zn and incidental impurities; and
   an oxide layer including Zn,
   wherein:
   the oxide layer serves as an uppermost layer of the Zn-based alloy coated layer and splits the intermetallic compound phase, and
   a split density in at least one cross-section of the oxide layer per unit cross-section is 10 split positions/mm or more.

2. The hot-pressed member according to claim 1, wherein split densities in two orthogonal cross-sections of the oxide layer per unit cross-section are both 10 split positions/mm or more.

3. A steel sheet for hot pressing, the steel sheet for hot pressing comprising:
   a steel sheet; and
   a Zn-based alloy coated layer disposed on at least one surface of the steel sheet, the Zn-based alloy coated layer including at least one element selected from Fe, Al, Mg, Si, Sr, Mn, Ti, Sn, In, Bi, Pb, and B such that a total content of the at least one element is 4% to 60% by mass, the Zn-based alloy coated layer having a coating weight of 10 to 90 g/m$^2$,
   wherein:
   the Zn-based alloy coated layer has a crack formed therein, the crack splitting the Zn-based alloy coated layer, and
   a crack density in at least one cross-section of the Zn-based alloy coated layer per unit cross-section is 10 split positions/mm or more.

4. The steel sheet for hot pressing according to claim 3, wherein crack densities in two orthogonal cross-sections of the Zn-based alloy coated layer per unit cross-section are both 10 split positions/mm or more.

5. A method for producing a steel sheet for hot pressing, the method comprising:
   providing a steel sheet provided with a Zn-based alloy coated layer disposed on at least one surface of the steel sheet, the Zn-based alloy coated layer including at least one element selected from Fe, Al, Mg, Si, Sr, Mn, Ti, Sn, In, Bi, Pb, and B with the balance being Zn and incidental impurities, a total content of the at least one element being 4% to 60% by mass, the Zn-based alloy coated layer having a coating weight of 10 to 90 g/m$^2$; and immersing the steel sheet provided with the Zn-based alloy coated layer in an acidic aqueous solution having a pH of 4.0 or less for 1.5 seconds or more.

6. The method for producing a steel sheet for hot pressing according to claim 5, wherein the acidic aqueous solution is a plating solution used for forming the Zn-based alloy coated layer.

7. A method for producing a hot-pressed member, the method comprising:
heating a steel sheet for hot pressing produced by the production method according to claim 6 to a temperature range of an $Ac_3$ transformation temperature to 1000° C.; and subsequently
performing hot pressing.

8. A method for producing a hot-pressed member, the method comprising:
heating a steel sheet for hot pressing produced by the production method according to claim 5 to a temperature range of an $Ac_3$ transformation temperature to 1000° C.; and subsequently
performing hot pressing.

9. A method for producing a hot-pressed member, the method comprising:
heating, to a temperature range of an $Ac_3$ transformation temperature to 1000° C., a steel sheet provided with a Zn-based alloy coated layer disposed on at least one surface of the steel sheet, the Zn-based alloy coated layer including at least one element selected from Fe, Al, Mg, Si, Sr, Mn, Ti, Sn, In, Bi, Pb, and B such that a total content of the at least one element is 4% to 60% by mass, the Zn-based alloy coated layer having a coating weight of 10 to 90 g/m$^2$; and subsequently
performing hot pressing,
wherein:
the Zn-based alloy coated layer has a crack formed therein, the crack splitting the Zn-based alloy coated layer, and
a crack density in at least one cross-section of the Zn-based alloy coated layer per unit cross-section is 10 split positions/mm or more.

* * * * *